(12) United States Patent
Seeley et al.

(10) Patent No.: US 11,112,110 B2
(45) Date of Patent: Sep. 7, 2021

(54) RADIANT BURNER

(71) Applicant: Edwards Limited, Burgess Hill (GB)

(72) Inventors: Andrew James Seeley, Bristol (GB); Duncan Michael Price, Wells (GB)

(73) Assignee: Edwards Limited

( * ) Notice: Subject to any disclaimer, the term of this patent is extended or adjusted under 35 U.S.C. 154(b) by 172 days.

(21) Appl. No.: 15/709,524

(22) PCT Filed: Mar. 23, 2016

(86) PCT No.: PCT/GB2016/050826
§ 371 (c)(1),
(2) Date: Sep. 20, 2017

(87) PCT Pub. No.: WO2016/156811
PCT Pub. Date: Oct. 6, 2016

(65) Prior Publication Data
US 2018/0135855 A1    May 17, 2018

(30) Foreign Application Priority Data

Mar. 30, 2015 (GB) ..................... 1505448

(51) Int. Cl.
*F23D 14/12* (2006.01)
*F23G 7/06* (2006.01)
(Continued)

(52) U.S. Cl.
CPC ............ *F23G 7/065* (2013.01); *F23C 99/006* (2013.01); *F23D 14/02* (2013.01); *F23D 14/12* (2013.01);
(Continued)

(58) Field of Classification Search
CPC ..... F23D 2203/1055; F23D 2900/1412; F23D 2203/005; F23D 14/12; F23G 2204/103;
(Continued)

(56) References Cited

U.S. PATENT DOCUMENTS 2,621,721 A   12/1952  Manteria
4,311,447 A *  1/1982  Rackley ................... F02G 3/00
                                                       126/92 AC
(Continued)

FOREIGN PATENT DOCUMENTS

CN     1180402 A    4/1998
CN     1292157 A    4/2001
(Continued)

OTHER PUBLICATIONS

"Machine Translation for DE3145028A1". 2020.*
(Continued)

*Primary Examiner* — Avinash A Savani
(74) *Attorney, Agent, or Firm* — Theodore M. Magee; Westman, Champlin & Koehler, P.A.

(57) ABSTRACT

A radiant burner for treating an effluent gas stream from a manufacturing processing tool includes a plurality of treatment chambers, each treatment chamber having an effluent stream inlet for supplying a respective portion of the effluent gas stream to that treatment chamber for treatment therewithin. In this way, multiple treatment chambers may be provided, each of which treats part of the effluent stream. Accordingly, the number of treatment chambers can be selected to match the flow rate of the effluent gas stream from any particular processing tool. This provides an architecture which is reliably scalable to suit the needs of any effluent gas stream flow rate.

16 Claims, 5 Drawing Sheets

(51) Int. Cl.
  *F23D 14/02*      (2006.01)
  *F23C 99/00*      (2006.01)
  *F23D 14/26*      (2006.01)
  *F23D 14/16*      (2006.01)

(52) U.S. Cl.
  CPC ............ *F23D 14/16* (2013.01); *F23D 14/26* (2013.01); *F23C 2700/043* (2013.01); *F23C 2900/99001* (2013.01); *F23D 2203/105* (2013.01); *F23D 2203/1055* (2013.01); *F23D 2900/1412* (2013.01); *F23G 2204/103* (2013.01); *F23G 2205/00* (2013.01); *F23G 2209/142* (2013.01); *F23G 2900/50006* (2013.01); *Y02E 20/34* (2013.01)

(58) Field of Classification Search
  CPC ........... F23G 2205/00; F23G 2209/142; F23G 2900/50006; F23G 7/06; F23G 2209/14; F23G 7/065; F23C 2700/043; F23C 2900/99001
  USPC .................................................. 431/5, 7, 326
  See application file for complete search history.

(56) References Cited

U.S. PATENT DOCUMENTS

| | | | |
|---|---|---|---|
| 5,306,138 A * | 4/1994 | Best ........................ | F23G 7/066 422/182 |
| 5,510,093 A | 4/1996 | Bartz et al. | |
| 2008/0131746 A1 | 6/2008 | Hody | |
| 2009/0263757 A1 | 10/2009 | Kaupert | |
| 2012/0034540 A1 | 2/2012 | Kaupert et al. | |
| 2012/0090338 A1 * | 4/2012 | Czerniak ................ | B01D 53/79 62/91 |
| 2013/0078539 A1 * | 3/2013 | Brandt .............. | H01M 8/04022 429/408 |

FOREIGN PATENT DOCUMENTS

| | | | | |
|---|---|---|---|---|
| CN | 101652607 A | 2/2010 | | |
| CN | 101755322 A | 6/2010 | | |
| CN | 202769674 U | 3/2013 | | |
| CN | 202884927 U | 4/2013 | | |
| CN | 103697475 A | 4/2014 | | |
| CN | 104006393 A | 8/2014 | | |
| CN | 203927919 U | 11/2014 | | |
| DE | 3145028 A1 * | 5/1983 | ............. | F23G 7/065 |
| GB | 2504335 A | 1/2014 | | |
| GB | 2513384 A | 10/2014 | | |
| JP | H10148309 A | 6/1998 | | |
| JP | 2001355822 A | 12/2001 | | |
| JP | 2010523929 A | 7/2010 | | |
| WO | 2011057897 A1 | 5/2011 | | |

OTHER PUBLICATIONS

British Search Report and Examination Report under Sections 17 and 18(3) dated Sep. 24, 2015 in GB Application GB 1505448.9, 7 pgs. including correction to prior art citations.
International Search Report and Written Opinion dated Jul. 4, 2016 in corresponding International Application No. PCT/GB2016/050826, 10 pgs.
Prosecution history of corresponding Chinese Application No. CN201680019973.7 including: First Office Action dated Nov. 5, 2018 and Chinese Search Report dated Oct. 26, 2018.
Taiwanese Office Action dated May 24, 2019 and Search Report dated May 17, 2019 for corresponding Taiwanese application Serial No. 105110121.
Notification of Reason for Rejection dated Aug. 19, 2019 for corresponding Japanese Application Serial No. 2017-551044.
Third Office Action dated Apr. 17, 2020 and Search Report dated Apr. 13, 2020 for corresponding Chinese application Serial No. CN201680019973.7.
Israeli Office Action dated Jan. 24, 2021 for corresponding Israeli application Serial No. 254373, 7 pages.

* cited by examiner

RADIANT BURNER

This application is a national stage entry under 35 U.S.C. § 371 of International Application No. PCT/GB2016/050826, filed 23 Mar. 2016, the entire content of which is incorporated herein by reference.

TECHNICAL FIELD OF THE INVENTION

The present invention relates to a radiant burner and method.

BACKGROUND OF THE INVENTION

Radiant burners are known and are typically used for treating an effluent gas stream from a manufacturing processing tool used in, for example, the semiconductor or flat panel display manufacturing industry. During such manufacturing, residual perfluorinated compounds (PFCs) and other compounds exist in the effluent gas stream pumped from the process tool. PFCs are difficult to remove from the effluent gas and their release into the environment is undesirable because they are known to have relatively high greenhouse activity.

Known radiant burners use combustion to remove the PFCs and other compounds from the effluent gas stream, such as that described in EP 0 694 735. Typically, the effluent gas stream is a nitrogen stream containing PFCs and other compounds. A fuel gas is mixed with the effluent gas stream and that gas stream mixture is conveyed into a combustion chamber that is laterally surrounded by the exit surface of a foraminous gas burner. Fuel gas and air are simultaneously supplied to the foraminous burner to affect flameless combustion at the exit surface, with the amount of air passing through the foraminous burner being sufficient to consume not only the fuel gas supply to the burner, but also all the combustibles in the gas stream mixture injected into the combustion chamber.

Although techniques exist for processing the effluent gas stream, they each have their own shortcomings. Accordingly, it is desired to provide an improved technique for processing an effluent gas stream.

SUMMARY OF THE INVENTION

According to a first aspect, there is provided a radiant burner for treating an effluent gas stream from a manufacturing processing tool, comprising: a plurality of treatment chambers, each treatment chamber having an effluent stream inlet for supplying a respective portion of said effluent gas stream to that treatment chamber for treatment therewithin. The first aspect recognizes that a problem with existing radiant burner configurations is that they are not easily scalable to deal with different effluent stream rates. That is to say, each radiant burner configuration is typically designed to deal with a specific effluent stream flow rate and that design is then validated through testing. Should a different effluent stream flow rate need to be treated, then a new design is typically required, which then needs to be validated. Although some standard parts can be reused, each radiant burner design is therefore essentially unique and the underlying architecture of existing arrangements has scalability limits.

Accordingly, a burner is provided. The burner may treat an effluent gas stream which may come from a manufacturing processing tool. The burner may have a plurality of treatment chambers. Each of those treatment chambers may have an inlet which receives a proportion or amount of the effluent stream to be treated within that treatment chamber. In this way, multiple treatment chambers may be provided, each of which treats part of the effluent stream. Accordingly, the number of treatment chambers can be selected to match the flow rate of the effluent gas stream from any particular processing tool. This provides an architecture which is reliably scalable to suit the needs of any effluent gas stream flow rate.

In one embodiment, each of said plurality of treatment chambers are adjacent another of said plurality of treatment chambers. Accordingly, the treatment chambers may be located next to or proximate each other in order to provide for a compact arrangement. Locating chambers adjacent each other may also reduce part count, since adjacent chambers may share common structures. Additionally, locating treatment chambers adjacent each other may enable combustion within one chamber to be propagated to adjacent chambers, thereby providing for reliable combustion within all the chambers from a single ignition source.

In one embodiment, said plurality of treatment chambers are arranged as one of a row, and an array of treatment chambers. Accordingly, the treatment chambers may be provided as a single row or may be provided as a matrix of rows and columns of treatment chambers, depending on the physical requirements constraining the dimensions of the radiant burner.

In one embodiment, the burner comprises a separating structure separating a pair of adjacent treatment chambers, said separating structure at least partially defining each adjacent pair of treatment chambers. Accordingly, a separating or dividing structure may be positioned to separate adjacent treatment chambers. In this way, adjacent treatment chambers may share the separating structure, thereby providing for improved simplicity of the architecture and reduced part count. It will be appreciated that the separating structure may help provide for separate or discrete adjacent treatment chambers, each of which may separately process their part of the effluent gas stream.

In one embodiment, said plurality of treatment chambers are arranged as a row of treatment chambers and each separating structure is located between each adjacent pair of treatment chambers within said row. Accordingly, where the treatment chambers are formed as a row, a separating structure may be provided between adjacent treatment chambers within that row.

In one embodiment, said row is arranged circumferentially. Accordingly, the row need not necessarily be a linear row, but may be arranged non-linearly and, for example, circumferentially. When arranged circumferentially, the row of treatment chambers may provide a complete or partial annulus.

In one embodiment, said plurality of treatment chambers are arranged as a matrix comprising a plurality of rows of treatment chambers and each separating structure is located between each adjacent pair of treatment chambers within each row. Accordingly, the treatment chambers may be provided as an array. Separating structures may also be located between adjacent treatment chambers within each row of that array.

In one embodiment, said plurality of treatment chambers are arranged as a matrix comprising a plurality of rows of treatment chambers and separating structures are located both between each adjacent pair of treatment chambers within each row and between each adjacent pair of treatment chambers in different rows. Accordingly, treatment chambers may be provided as an array of rows and columns and separating structures may be located between adjacent treatment chambers within each row and also between adjacent treatment chambers within each column.

In one embodiment, said separating structures within each row and said separating structures between each row are orthogonally orientated. Accordingly, the separating structures between columns may be positioned orthogonally to the separating structures between rows.

In one embodiment, said separating structure comprises a pair of foraminous walls through which treatment materials pass for introduction into both said adjacent pair of treatment chambers, each foraminous wall at least partially defining one of said adjacent pair of treatment chambers. Accordingly, the separating structure may be porous to enable treatment materials to be introduced into both treatment chambers.

In one embodiment, said pair of foraminous walls comprise an opposing pair of foraminous walls. Accordingly, one of the walls may define part of one of the treatment chambers, whilst the other wall may define part of the adjacent treatment chamber.

In one embodiment, said pair of foraminous walls are complimentarily-shaped. Hence, the pair of walls may be of matching shape.

In one embodiment, said pair of foraminous walls are planar.

In one embodiment, said pair of foraminous walls are quadrilateral-shaped.

In one embodiment, said pair of foraminous walls are orientated to have a parallel component with respect to each other. Hence, at least one component of the pair of walls' orientation may be parallel.

In one embodiment, said separating structure tapers in a direction of flow of said portion of said effluent stream. By tapering the separating structure, residue deposits on the separating structure may be minimized since the taper reduces the force of the expanding effluent gas stream as it is heated within the treatment chamber.

In one embodiment, said pair of foraminous walls are orientated so that planes defined by each of said pair of foraminous walls intersect. Accordingly, the pair of foraminous walls may define the tapering separating structure, as the walls are orientated to converge.

In one embodiment, said separating structure comprises a foraminous connecting portion connecting said pair of foraminous walls along an edge. Providing a foraminous connecting portion along an edge which may be located away from the effluent stream inlet helps to reduce residue deposits by purging that region.

In one embodiment, said connecting portion is curved. Providing a curved portion helps to provide a surface lacking discontinuities and over which ignition between treatment chambers can be propagated.

In one embodiment, said separating structure comprises a treatment material inlet for supplying said treatment materials into a void defined by said separating structure. Accordingly, the treatment materials may be pumped into a void within the separating structure in order to flow through the foraminous walls.

In one embodiment, said separating structure comprises a plurality of treatment material inlets for supplying said treatment materials into a void defined by said separating structure.

In one embodiment, each treatment material inlet is at least one of circular, elongate, quadrilateral and obround shaped.

In one embodiment, the burner comprises an end structure at least partially defining an end treatment chamber, said end structure comprising a foraminous wall through which treatment materials pass for introduction into said end treatment chamber and a non-foraminous wall, said foraminous wall at least partially defining said end treatment chamber. Accordingly, an end structure may be provided which only has a single foraminous wall. Such an end structure may be located where there is no other treatment chamber adjacent that end structure. This ensures that the treatment materials are only provided into the end treatment chamber.

In one embodiment, said end structure is located opposite each separating structure of that end treatment chamber.

In one embodiment, said foraminous wall and non-foraminous wall comprise an opposing pair of walls.

In one embodiment, said opposing pair of walls are complimentarily-shaped.

In one embodiment, said opposing pair of walls are planar.

In one embodiment, said opposing pair of walls are quadrilateral-shaped.

In one embodiment, said opposing pair of walls orientated to have a parallel component with respect to each other.

In one embodiment, said end structure tapers in a direction of flow of said portion of said effluent stream.

In one embodiment, said opposing pair of walls are orientated so that planes defined by each of said opposing pair of walls intersect.

In one embodiment, said separating structure comprises a foraminous connecting portion connecting said opposing pair of walls along an edge.

In one embodiment, said connecting portion is curved.

In one embodiment, said end structure comprises a treatment material inlet for supplying said treatment materials into a void defined by said end structure.

In one embodiment, said end structure comprises a plurality of treatment material inlets for supplying said treatment materials into a void defined by said end structure.

In one embodiment, each treatment material inlet is at least one of circular, elongate, quadrilateral and obround shaped.

In one embodiment, said treatment materials comprise at least one of air and fuel.

In one embodiment, each treatment chamber comprises a ceiling defining said effluent stream inlet for supplying said respective portion of said effluent gas stream to that treatment chamber. Accordingly, an upper part of the treatment chamber is provided with a ceiling which defines the inlet or through which the inlet is provided to supply the effluent stream to that treatment chamber.

In one embodiment, said ceiling defines a plurality of effluent stream inlets for supplying said respective portion of said effluent gas stream to that treatment chamber.

In one embodiment, each effluent stream inlet is at least one of circular, elongate, quadrilateral and obround shaped.

In one embodiment, each treatment chamber comprises an open face through which said treated effluent gas stream exhausts. Accordingly, the treatment chamber may be open on one face in order that the treated effluent stream gas may be exhausted therefrom.

In one embodiment, each of said plurality of treatment chambers exhaust said treated effluent stream to a common cooling chamber. Accordingly, each of the treatment chambers provides the treated effluent stream to a single, common cooling chamber which cools all of the treated effluent stream. Hence, the single cooling chamber cools the effluent stream from multiple treatment chambers.

In one embodiment, the burner comprises a housing configured to receive each separating structure, said housing at least partially defining each treatment chamber. Accordingly, the housing may also provide part of each treatment chamber.

In one embodiment, said housing is configured to receive each end structure.

In one embodiment, portions of said housing which at least partially define each treatment chamber are foraminous for supplying a purge gas stream to that treatment chamber. Accordingly, parts of the housing itself may also be foraminous. Those parts may be those which define and therefore are proximate to each treatment chamber. A purge gas stream may be provided through the housing in order to purge the part of each treatment chamber which is defined by the housing in order to reduce residue deposits on that part of the treatment chamber.

In one embodiment, said housing defines a plenum to supply said purge gas stream to said portions of said housing. Providing a plenum is a convenient way to provide the purge gas to many portions of the housing.

In one embodiment, said purge gas comprises said treatment materials.

In one embodiment, said portions of said housing which at least partially define each treatment chamber are faceted to extend into said treatment chamber. Faceting or angling the portions of the housing again helps to reduce residue deposits on those portions.

In one embodiment, said housing defines a one of a hexahedron and a cylinder. Accordingly, when the treatment chambers are arranged in a linear row or as a matrix, then the housing may typically be a hexahedron. When the row of treatment chambers is arranged circumferentially, the housing may typically be cylindrical.

In one embodiment, said plurality of treatment chambers exhaust said treated effluent stream through an open face of said housing to said common cooling chamber. Accordingly, the housing may have an open face through which the treated effluent stream from the treatment chambers exhausts and is provided to a common cooling chamber.

In one embodiment, the burner comprises an electrical energy device coupled with each separating structure and/or end structure and operable to provide electrical energy to heat the separating structure and/or end structure which heats the treatment materials as they pass through the separating structure and/or end structure into the treatment chamber. In this way, electrical energy, rather than combustion, can be used to raise the temperature within the treatment chamber in order to treat the effluent gas stream. This provides for greater flexibility in the use of such burners since the burner can be used in environments where no fuel gas exists or where the provision of fuel gas is considered undesirable. Also, heating the treatment materials as they pass through the separating structure and/or end structure, rather than simply using radiant heat to heat the treatment chamber enables significantly more energy to be imparted into the treatment materials as they transit through.

In one embodiment, the separating structure and/or end structure has a porosity of between 80% and 90%.

In one embodiment, the separating structure and/or end structure has a pore size of between 200 μm and 800 μm.

In one embodiment, the separating structure and/or end structure comprises at least one of an electrically conductive, a ceramic and a dielectric material. The material used for the separating structure and/or end structure may vary, depending upon the mechanism used to heat the separating structure and/or end structure.

In one embodiment, the separating structure and/or end structure comprises a sintered metal.

In one embodiment, the sintered metal comprises at least one of fibres, powder, and granules.

In one embodiment, the separating structure and/or end structure comprises a woven metallic cloth.

In one embodiment, the electrical energy device comprises at least one of a radio-frequency power supply, an electrical power supply and a microwave generator. Accordingly, the electrical energy device may vary, depending upon the mechanism used to heat the material selected for the separating structure and/or end structure.

In one embodiment, the electrical energy device comprises a coupling coupled with the separating structure and/or end structure, the coupling comprising at least one of a radio-frequency conductor, an electrical conductor and a waveguide. Accordingly, the coupling which couples the electrical energy device with the separating structure and/or end structure may vary, dependent upon the type of energy being conveyed from that electrical energy device to the separating structure and/or end structure.

In one embodiment, the at least one of the radio-frequency conductor, the electrical conductor and the waveguide is located within a void through which the treatment materials pass, the void being provided within the separating structure and/or end structure. Accordingly, the coupling may be located within the void within the separating structure and/or end structure and from which the treatment materials are provided. This conveniently reuses an existing void to locate the coupling adjacent the separating structure and/or end structure in order to maximize energy transfer to that separating structure and/or end structure.

In one embodiment, the at least one of the radio-frequency conductor, the electrical conductor and the waveguide extend over the separating structure and/or end structure to heat across its area. Accordingly, the coupling may cover or spread out over the separating structure and/or end structure to heat the whole or desired parts of its area.

In one embodiment, the radio frequency power supply provides radio frequency electrical energy using the radio frequency conductor to inductively heat the conductive material. Accordingly, the separating structure and/or end structure may be heated using inductive heating.

In one embodiment, the radio frequency electrical energy has a frequency of one of between 500 Hz and 500 KHz, between 20 KHz and 50 KHz and around 30 KHz.

In one embodiment, the radio frequency conductor is located proximate the conductive material. Hence, the conductor may be located adjacent the conductive material in order to facilitate the inductive heating.

In one embodiment, the radio frequency conductor is hollow to receive a cooling fluid to cool the radio frequency conductor. Utilizing a hollow conductor enables the cooling fluid to be received within that conductor in order to control its temperature and so reduce losses, which improves the efficiency of the inductive heating.

In one embodiment, the cooling fluid has a conductivity of no more than 100 μS.

In one embodiment, the burner comprises a humidifier operable to provide humidified air as the treatment materials and wherein the cooling fluid is circulated through the humidifier to heat water provided to the humidifier. Accordingly, the heat extracted by the cooling fluid may be reused to heat water provided to the humidifier in order to reduce the energy consumption of the humidifier.

In one embodiment, the water provided to the humidifier comprises at least some of the cooling fluid. Reusing the cooling fluid as the water further improves the heating efficiency and reduces the power consumption of the humidifier.

In one embodiment, the cooling fluid is maintained at a higher than ambient temperature. Maintaining the cooling fluid at a higher than ambient temperature helps to minimize the likelihood of condensation within the void.

In one embodiment, the electrical power supply provides electrical energy using the electrical conductor to heat the ceramic material. Accordingly, the separating structure and/or end structure may be heated using resistive heating.

In one embodiment, the microwave generator provides microwave energy using the waveguide to heat the dielectric material. Accordingly, the separating structure and/or end structure may be heated using microwave energy.

In one embodiment, the dielectric material comprises silicon carbide.

In one embodiment, the microwave energy has a frequency of one of 915 MHz and 2.45 GHz. Operating around the 2.45 GHz range provides for a smaller arrangement, although this is less energy-efficient than operating at the 915 MHz range.

In one embodiment, the separating structure comprises a porous thermal insulator through which the treatment materials pass, the porous thermal insulator being provided in the void between the porous sleeve and the electrical energy device. Providing a thermal insulator helps to insulate the separating structure and/or end structure, which reduces the ambient temperature within the void, helps protect the coupling and increases the temperature within the treatment chamber.

According to a second aspect, there is provided a radiant burner method for treating an effluent gas stream from a manufacturing processing tool, comprising: providing a plurality of treatment chambers, each treatment chamber having an effluent stream inlet for supplying a respective portion of said effluent gas stream to that treatment chamber for treatment therewithin.

In one embodiment, the method comprises arranging each of said plurality of treatment chambers adjacent another of said plurality of treatment chambers.

In one embodiment, the method comprises arranging said plurality of treatment chambers as one of a row and an array of treatment chambers.

In one embodiment, the method comprises separating a pair of adjacent treatment chambers with a separating structure, said separating structure at least partially defining each adjacent pair of treatment chambers.

In one embodiment, the method comprises arranging said plurality of treatment chambers as a row of treatment chambers and locating each separating structure between each adjacent pair of treatment chambers within said row.

In one embodiment, the method comprises arranging said row circumferentially.

In one embodiment, the method comprises arranging said plurality of treatment chambers as a matrix comprising a plurality of rows of treatment chambers and locating each separating structure between each adjacent pair of treatment chambers within each row.

In one embodiment, the method comprises arranging said plurality of treatment chambers as a matrix comprising a plurality of rows of treatment chambers and locating separating structures both between each adjacent pair of treatment chambers within each row and between each adjacent pair of treatment chambers in different rows.

In one embodiment, the method comprises orientating said separating structures within each row and said separating structures between each row orthogonally with respect to each other.

In one embodiment, said separating structure comprises a pair of foraminous walls through which treatment materials pass for introduction into both said adjacent pair of treatment chambers, each foraminous wall at least partially defining one of said adjacent pair of treatment chambers.

In one embodiment, said pair of foraminous walls comprise an opposing pair of foraminous walls.

In one embodiment, said pair of foraminous walls are complimentarily-shaped.

In one embodiment, said pair of foraminous walls are planar.

In one embodiment, said pair of foraminous walls are quadrilateral-shaped.

In one embodiment, the method comprises orientating said pair of foraminous walls to have a parallel component with respect to each other.

In one embodiment, said separating structure tapers in a direction of flow of said portion of said effluent stream.

In one embodiment, the method comprises orientating said pair of foraminous walls so that planes defined by each of said pair of foraminous walls intersect.

In one embodiment, said separating structure comprises a foraminous connecting portion connecting said pair of foraminous walls along an edge.

In one embodiment, said connecting portion is curved.

In one embodiment, said separating structure comprises a treatment material inlet for supplying said treatment materials into a void defined by said separating structure.

In one embodiment, said separating structure comprises a plurality of treatment material inlets for supplying said treatment materials into a void defined by said separating structure.

In one embodiment, each treatment material inlet is at least one of circular, elongate, quadrilateral and obround shaped.

In one embodiment, the method comprises providing an end structure at least partially defining an end treatment chamber, said end structure comprising a foraminous wall through which treatment materials pass for introduction into said end treatment chamber and a non-foraminous wall, said foraminous wall at least partially defining said end treatment chamber.

In one embodiment, the method comprises locating said end structure opposite each separating structure of that end treatment chamber.

In one embodiment, said foraminous wall and non-foraminous wall comprise an opposing pair of walls.

In one embodiment, said opposing pair of walls are complimentarily-shaped.

In one embodiment, said opposing pair of walls are planar.

In one embodiment, said opposing pair of walls are quadrilateral-shaped.

In one embodiment, the method comprises orientating said opposing pair of walls to have a parallel component with respect to each other.

In one embodiment, said end structure tapers in a direction of flow of said portion of said effluent stream.

In one embodiment, the method comprises orientating said opposing pair of walls so that planes defined by each of said opposing pair of walls intersect.

In one embodiment, said separating structure comprises a foraminous connecting portion connecting said opposing pair of walls along an edge.

In one embodiment, said connecting portion is curved.

In one embodiment, said end structure comprises a treatment material inlet for supplying said treatment materials into a void defined by said end structure.

In one embodiment, said end structure comprises a plurality of treatment material inlets for supplying said treatment materials into a void defined by said end structure.

In one embodiment, each treatment material inlet is at least one of circular, elongate, quadrilateral and obround shaped.

In one embodiment, said treatment materials comprise at least one of air and fuel.

In one embodiment, each treatment chamber comprises a ceiling defining said effluent stream inlet for supplying said respective portion of said effluent gas stream to that treatment chamber.

In one embodiment, said ceiling defines a plurality of effluent stream inlets for supplying said respective portion of said effluent gas stream to that treatment chamber.

In one embodiment, each effluent stream inlet is at least one of circular, elongate, quadrilateral and obround shaped.

In one embodiment, each treatment chamber comprises an open face through which said treated effluent gas stream exhausts.

In one embodiment, each of said plurality of treatment chambers exhausts said treated effluent stream to a common cooling chamber.

In one embodiment, the method comprises providing a housing configured to receive each separating structure, said housing at least partially defining each treatment chamber.

In one embodiment, said housing is configured to receive each end structure.

In one embodiment, portions of said housing which at least partially define each treatment chamber are foraminous for supplying a purge gas stream to that treatment chamber.

In one embodiment, said housing defines a plenum to supply said purge gas stream to said portions of said housing.

In one embodiment, said purge gas comprises said treatment materials.

In one embodiment, said portions of said housing which at least partially define each treatment chamber are faceted to extend into said treatment chamber.

In one embodiment, said housing defines one of a hexahedron and a cylinder.

In one embodiment, said plurality of treatment chambers exhaust said treated effluent stream through an open face of said housing to said common cooling chamber.

In one embodiment, said effluent gas stream has a flow rate 'R' and each treatment chamber is operable to treat defined flow rate 'N' of said effluent gas stream and said step of providing treatment chambers comprises providing at least 'R'/'N' treatment chambers.

In one embodiment, the method comprises heating the treatment materials as they pass through the separating structure and/or end structure into the treatment chamber by heating the porous sleeve using electrical energy from an electrical energy device coupled with the separating structure or end structure.

In one embodiment, the separating structure and/or end structure has at least one of a porosity of between 80% and 90% and a pore size of between 200 μm and 800 μm.

In one embodiment, the separating structure and/or end structure comprises an annular sleeve defining a cylindrical treatment chamber therewithin.

In one embodiment, the separating structure and/or end structure comprises at least one of an electrically conductive, a ceramic and a dielectric material.

In one embodiment, the separating structure and/or end structure comprises a sintered metal.

In one embodiment, the sintered metal comprises at least one of fibres, powder, and granules.

In one embodiment, the separating structure and/or end structure comprises a woven metallic cloth.

In one embodiment, the electrical energy device comprises at least one of a radio-frequency power supply, an electrical power supply and a microwave generator.

In one embodiment, the method comprises coupling the electrical energy device with the separating structure and/or end structure using at least one of a radio-frequency conductor, an electrical conductor and a waveguide.

In one embodiment, the method comprises locating the at least one of the radio-frequency conductor, the electrical conductor and the waveguide within a void through which the treatment materials pass, the void being provided within the separating structure and/or end structure.

In one embodiment, the at least one of the radio-frequency conductor, the electrical conductor and the waveguide extend over the separating structure and/or end structure to heat across its area.

In one embodiment, the heating comprises providing radio frequency electrical energy from the radio frequency power supply using the radio frequency conductor to inductively heat the conductive material.

In one embodiment, the radio frequency electrical energy has a frequency of one of between 500 Hz and 500 KHz, between 20 KHz and 50 KHz and around 30 KHz.

In one embodiment, the method comprises locating the radio frequency conductor proximate the conductive material.

In one embodiment, the radio frequency conductor is hollow and the method comprises receiving a cooling fluid within the radio frequency conductor to cool the radio frequency conductor.

In one embodiment, the cooling fluid has a conductivity of no more than 100 μS.

In one embodiment, the method comprises providing humidified air as the treatment materials from a humidifier and circulating the cooling fluid through the humidifier to heat water provided to the humidifier.

In one embodiment, the method comprises providing at least some of the cooling fluid to the humidifier as the water.

In one embodiment, the method comprises maintaining the cooling fluid at a higher than ambient temperature.

In one embodiment, the heating comprises providing electrical energy from the electrical power supply using the electrical conductor to heat the ceramic material.

In one embodiment, the heating comprises providing microwave energy from the microwave generator using the waveguide to heat the dielectric material.

In one embodiment, the dielectric material comprises silicon carbide.

In one embodiment, the microwave energy has a frequency of one of 915 MHz and 2.45 GHz.

In one embodiment, the method comprises passing the treatment material through a porous thermal insulator, the porous thermal insulator being provided in the void between the separating structure and/or end structure and the electrical energy device.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

In order that the present invention may be well understood, two embodiments thereof, which are given by way of example only, will now be described in more detail, with reference to the accompanying drawings, in which.

DETAILED DESCRIPTION OF THE EMBODIMENTS

Before discussing the embodiments in any more detail, first an overview will be provided. Embodiments provide a burner arrangement which has a plurality of separated treatment chambers, each one of which is supplied with a portion of an effluent gas stream that is to be treated. This provides for a scalable architecture because the operational performance of an individual treatment chamber may be determined and, from this, the required number of treatment chambers can be determined for any particular effluent gas stream flow rate by providing the required number of these treatment chambers for that flow rate. Each treatment chamber may be positioned adjacent to another to provide a compact arrangement and so that they may share common structures in order to reduce part count. Typically, the treatment chambers may be arranged as a row or an array of treatment chambers, depending on the spatial constraints. The separating structures between the treatment chambers may provide the treatment materials for introduction into those treatment chambers.

Embodiments also provide for an electrically-powered radiant burner, which enables the effluent gas stream to be treated in situations where providing a fuel gas to raise the temperature of the treatment chamber is undesirable or simply not possible. Unlike traditional radiant heaters, which are unable to obtain the required power density, electrical energy is provided to heat treatment materials as they pass through the porous sleeve into the treatment chamber by heating the porous sleeve which considerably increases the power density and the achievable temperature within the treatment chamber.

Single Row Arrangement

Figure 1A:
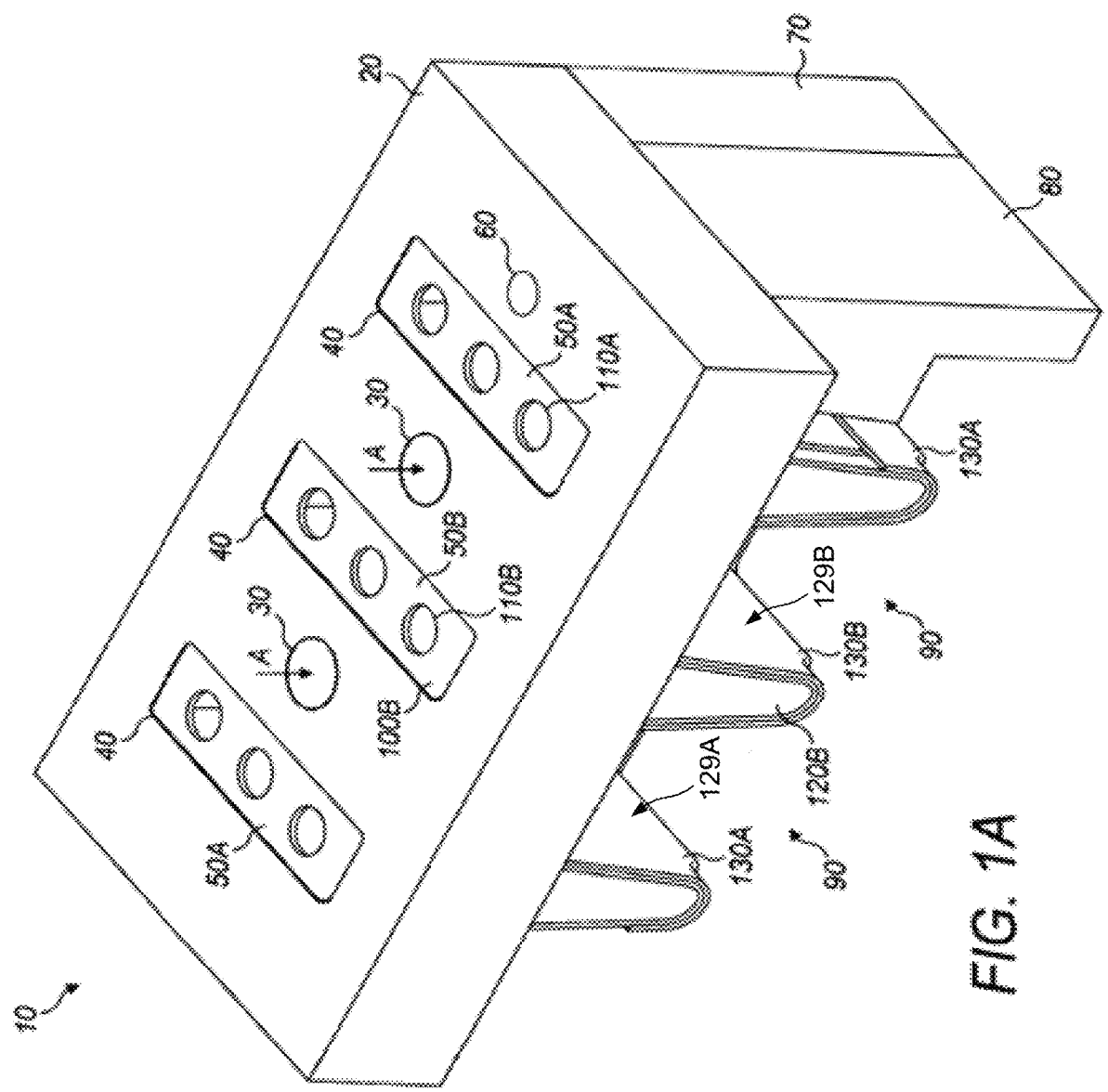
FIG. 1A illustrates a radiant burner according to one embodiment and FIG. 1B illustrates a radiant burner according to the same embodiment as in FIG. 1A, but from a different visual perspective.
Figure 1B:
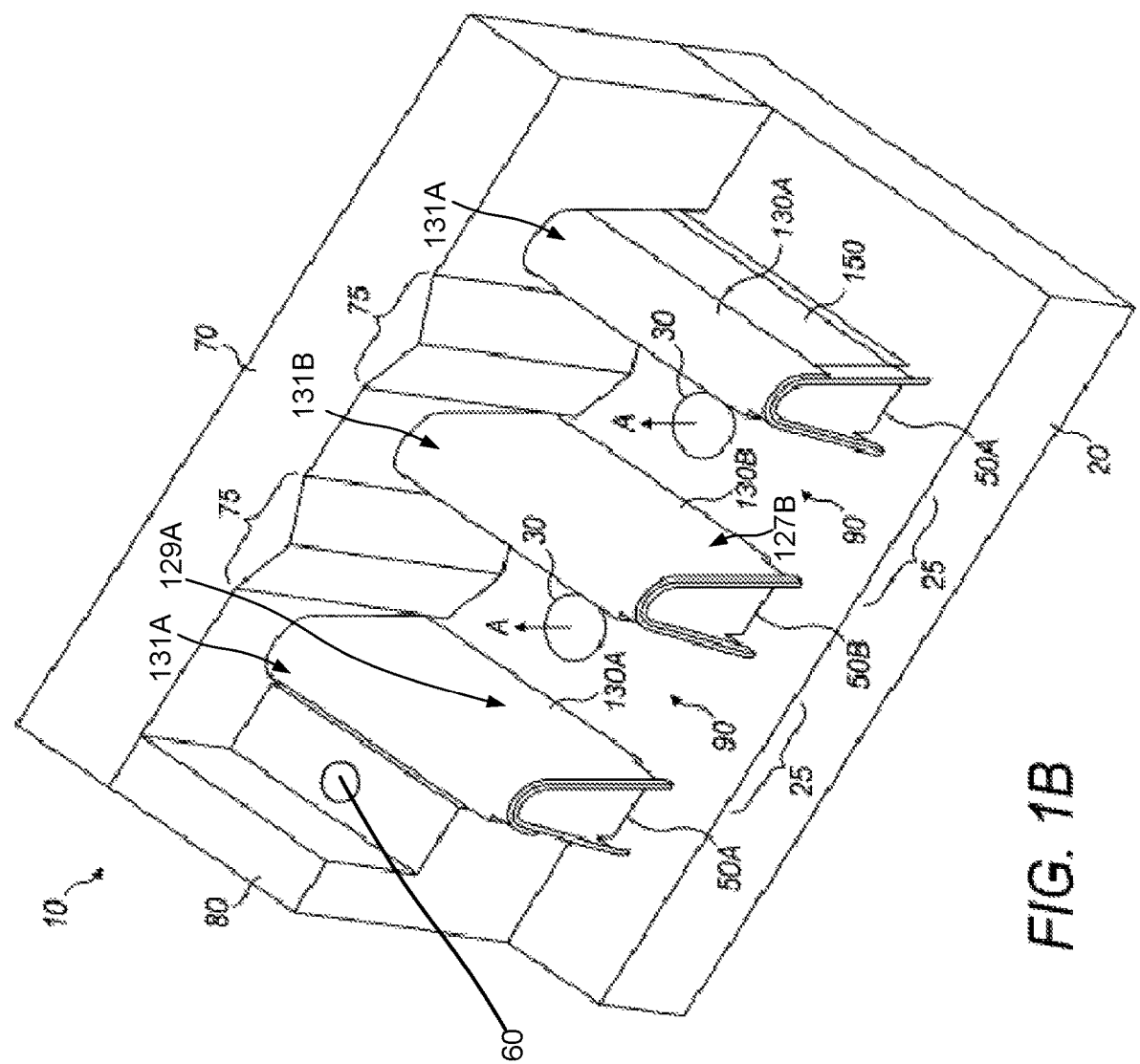

FIGS. 1A and 1B illustrate a radiant burner, generally 10, according to one embodiment. In order to improve clarity, a side wall and end wall have been omitted. The radiant burner 10 comprises an upper portion 20 of a housing. The upper portion 20 comprises a plurality of effluent stream inlets for receiving an effluent stream to be treated. The upper portion 20 also comprises a plurality of apertures 40 shaped to receive either a separating structure or an end structure. In this example, the upper portion 20 receives two end structures 50A and one separating structure 50B. Also provided in the upper portion 20 is a pilot aperture 60 via which a pilot flame may be provided to initiate ignition within the radiant burner 10. The radiant burner 10 comprises a pair of opposing sidewalls 70 (only one of which is shown in FIGS. 1A and 1B), together with a pair of end walls 80 (again, only a single end wall 80 is shown in FIGS. 1A and 1B).

The upper portion 20, together with the side walls 70 and the end walls 80, create a box-like housing having an open face into which the separating structure 50B and end structures 50A extend. The separating structure 50B and end structures 50A partition up the space within the housing to define individual treatment chambers 90. In this embodiment, each treatment chamber 90 is therefore bounded by a separating structure 50B and an end structure 50A, as well as by portions 75 of the side walls 70 and portions 25 of the upper portion 20. To simplify construction, the separating structure 50B and the end structures 50A have the same dimensional configuration.

In this embodiment, the separating structure 50B has a rectangular upper face 100B in which is provided with three equally-spaced treatment material inlet apertures 110B. The upper face 100B is received within a central aperture 40. A sheet 130B of foraminous material is coupled with the two major sides of the upper face 100B and extends into the housing. The sheet 130B is curved at a position furthermost from the face 100B, thereby providing a pair of foraminous walls 127B and 129B separated by a curved foraminous connecting portion 131B. A pair of opposing end plates 120B are located proximate to opposing edges of the sheet 130B in order to enclose a space within the separating structure 50B into which the treatment materials pass via the treatment material inlets 110B. In this embodiment, the treatment materials are fuel and air and these are pumped into the void within the separating structure 50B; these then pass through the sheet 130B where they are ignited to effect flameless burning thereon.

The end structures 50A are of substantially the same construction as the separating structure 50B, but the sheet 130A of foraminous material terminates after the bend so as to define a foraminous wall 129A and a foraminous connecting portion 131A and a non-porous blanking plate 150 forming a non-foraminous wall is provided adjacent the facing end walls 80. This ensures that the treatment materials provided via the treatment material inlet apertures 110A are only provided in the vicinity of the treatment chambers 90 and that no combustion occurs between the end structures 50A and the end walls 80.

The effluent gas stream to be treated is split into individual flows, one to be treated in each of the separate treatment chambers 90. In this embodiment, the effluent gas stream is split into two flows, one to be treated in each of the two different treatment chambers 90 via the effluent stream inlets 30. Treatment materials are provided to the treatment material inlet apertures 110A, 110B. Ignition of the treatment materials is effected via a flame extending from the pilot aperture 60. Flameless combustion occurs across the surface of the sheets 130A, 130B and abatement of the effluent gas stream occurs within the treatment chambers 90.

As can be seen in FIGS. 1A and 1B, the end structures 50A and the separating structure 50B are arranged to be generally parallel to each other in order to provide for uniform conditions within each treatment chamber 90. The end structures 50A and separating structure 50B are inwardly tapered in the direction of the effluent stream flow A in order to accommodate expansion of the effluent stream as it is heated within each treatment chamber. This helps to reduce the impact of any residues on the sheets 130A, 130B.

The provision of the curved portion of the sheets 130A, 130B helps to prevent residue deposits in that region and provides additional heating at a region of the treatment chamber 90 which experiences high heat loss. Also, the provision of the tapered and curved portion of the sheets 130A, 130B helps to prevent any discontinuities so that ignition from the single ignition source 60 can propagate reliably to each end structure 50A and separating structure 50B. This avoids the need for combustion sight windows or temperature probes.

The portions 75 of the side walls 70 are tapered or faceted into the treatment chamber 90 in order to urge combustion by-products away from those surfaces and reduce residue deposits thereon. Hence, it can be seen that each combustion chamber 90 provides a uniform combustion space within which a portion of the effluent stream is processed.

Although in this embodiment, two treatment chambers 90 are provided, the number of treatment chambers 90 can be easily changed by changing the number of separating structures 50B. This provides a completely scalable architecture which can treat any flow rate of the effluent gas stream. For example, should double the rate of effluent gas stream need to be processed, then four instead of two treatment chambers 90 may be provided through the provision of three separating structures 50B and two end structures 50A. Since the performance of each individual treatment chamber 90 is validated, the performance of a larger number of those treatment chambers can also be assured.

Array Arrangement

Figure 2A:
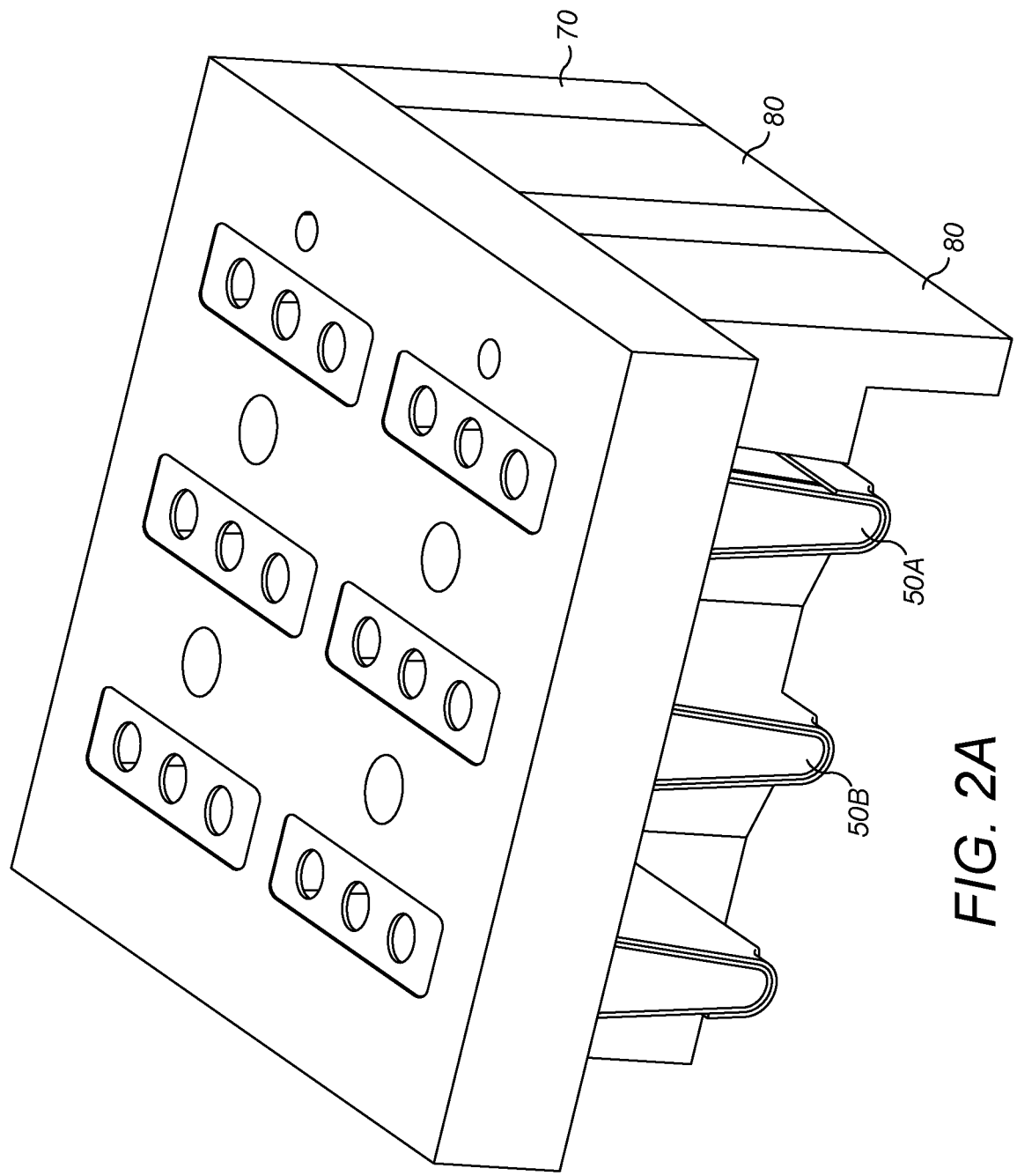
FIG. 2A illustrates a radiant burner according to one embodiment and 2B illustrates a radiant burner according to the same embodiment as in FIG. 2A, but from a different visual perspective.
Figure 2B:
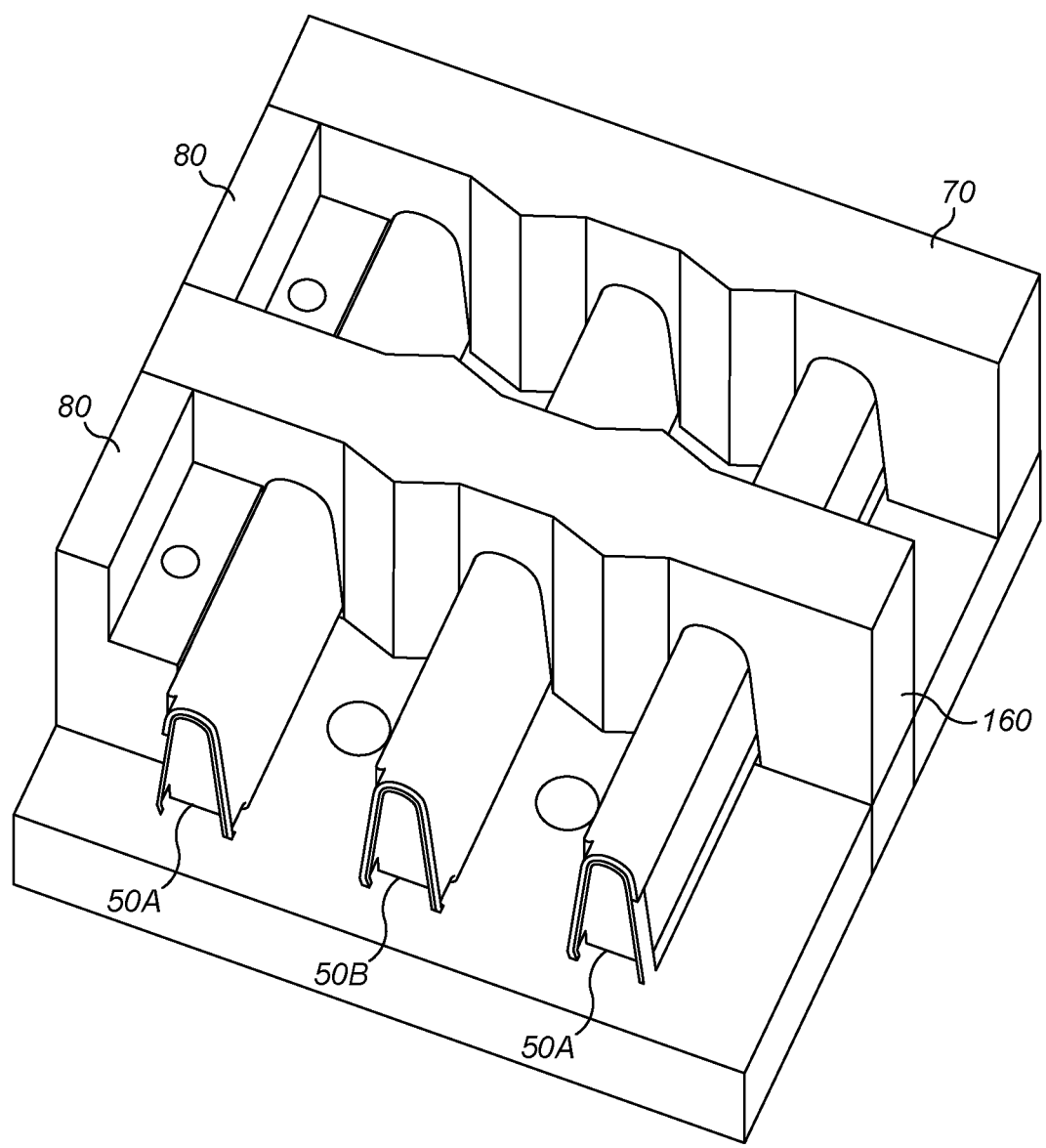

FIGS. 2A and 2B illustrate an alternative arrangement for treating double the flow rate of the effluent gas stream compared to that treated by the arrangement shown in FIGS. 1A and 1B. In this embodiment, the arrangement of FIGS. 1 and 1A is duplicated to provide two rows of treatment chambers 90, separated by an intervening wall 160 (again, a sidewall 70 and end wall 80 has been omitted to improve clarity).

Hence, it can be seen that many of the component parts may simply be reused in order to scale the radiant burner for a new flow rate of effluent gas stream. For example, if one treatment chamber 90 is configured to treat one hundred standard litres of effluent gas stream and four hundred standard litres of effluent gas stream are required to be treated, then an arrangement such as that illustrated in FIGS. 2A and 2B may be utilized which has four treatment chambers 90, each of which is able to treat one hundred standard litres per minute of effluent gas stream, totalling four hundred standard litres per minute.

In another embodiment, rather than having the separating structure 160, a structure similar to the separating structures 50B is provided, which separate one treatment chamber 90 from another. In other words, separating structures 50B are provided in place of the wall 160 and are orientated orthogonally with respect to the separating structures 50B illustrated in FIGS. 2A and 2B. This provides for combustion on more than two sides of each treatment chamber 90. An advantage of such an arrangement is that only a single pilot aperture 60 is required as ignition can propagate between the rows of treatment chambers 90.

Whichever arrangement is used, the treated effluent stream from each treatment chamber 90 exhausts or vents via the open face of the housing into a downstream cooling chamber (not shown).

Electrical Heating

Figure 3:
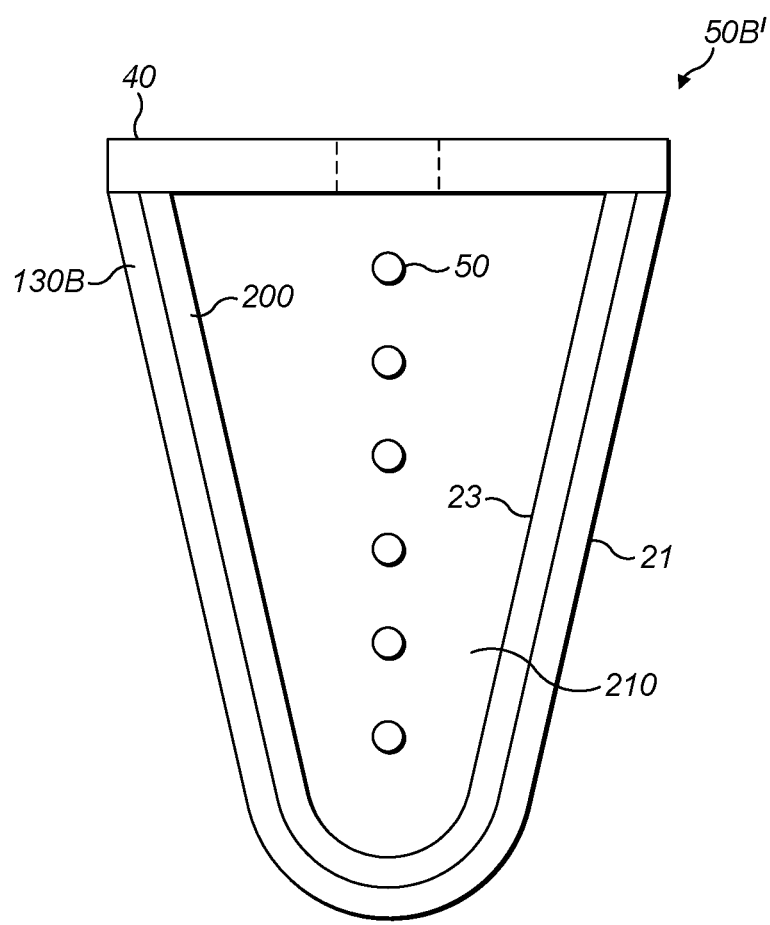
FIG. 3 illustrates a cross section through a modified separating structure.

In one embodiment, rather than combusting fuel and air, electrical heating of the treatment chamber 90 occurs using a modified separating structure 50B', as shown in FIG. 3 which is a cross section through the modified separating structure 50B'. The end structures 50A are similarly modified to facilitate electrical heating. In this embodiment, sheet 130B is made of a material which is suitable for the selected mode of heating. In this embodiment, inductive heating is used and so the sheet 130B comprises a porous metal, for example sintered metal fibre, of a heat-resisting alloy, such as FECRALLOY®.

An inner surface of sheet 130B is lined with an insulating sheet 200. The insulating sheet is a porous ceramic, for example, an alumina sheet which may be formed by sintering an alumina slip which has been used to coat a reticulated polyurethane foam. Alternatively, the insulating sheet 200 may be a blanket of ceramic fibre. The insulating sheet 200 helps to elevate the temperature within the treatment chamber 90 by reducing heat loss and also helps to reduce the temperature within the void 210 within the separating structure 50B, which in turn reduces the temperature of the components used for inductive heating to improve their efficiency.

The insulating sheet 200 and the sheet 130B are typically 80% to 90% porous, with a pore size between 200 μm and 800 μm.

In this embodiment, the treatment gas may be air, or a blend of air and other species such as water vapour and CO2. In this example, humidified air is introduced and the humidified air passes from an entry surface 23 of the insulating sheet 200 to an exit surface 21 of the sheet 130B.

In this embodiment, an inductive heating mechanism is used and so the void 210 also contains a work coil 50 (which follows a serpentine or other winding path within the void 210) which is connected to a radio-frequency (RF) power supply (not shown) for heating the sheet 130B by RF induction. The work coil 50 is typically a coiled copper hollow tube, cooled by circulation of a cooling fluid, for example water, with a low electrical conductivity, for example <100 μS. If the supplied air is enriched with water vapour, then it may be beneficial to operate the cooling fluid at an elevated temperature so as to avoid condensation on the work coil 50. This may be achieved conveniently by use of a closed-loop circuit. As mentioned above, the insulating sheet 200 serves as a thermal insulator to protect the work coil 50.

Electrical energy supplied to the sheet 130B heats the sheet 130B. This in turn heats the humidified air as it passes from an entry surface 23 of the insulating sheet 210 to the exit surface 21 of the sheet 130B. In addition, the heat generated by the sheet 130B raises the temperature within the treatment chamber 90. The amount of electrical energy supplied to the sheet 130B is varied to vary the nominal temperature within the treatment chamber 90 to that which is appropriate for the effluent gas stream to be treated. For example, the sheet 130B is heated to between 800° C. and 1200° C. and the humidified air is likewise heated to this temperature. This is achieved by supplying electrical energy at a level of typically between around 10 kW and kW applied to sheet 130B. This provides an equivalent power density of between around 70 kWm$^{-2}$ and 140 kWm$^{-2}$. The applied power is related to the flow rate of air through the sheet 130A, 130B. One skilled in the art would recognise that other conditions of power, air flow and temperature are possible. Typically, the radio frequency electrical energy has a frequency of between 500 Hz and 500 KHz, preferably between 20 KHz and 50 KHz and more preferably around 30 KHz. The effluent gas stream containing noxious substances to be treated is caused to mix with this hot gas in a known manner in the treatment chamber 90. The exhaust of the treatment chamber 90 is open to enable the combustion products to be output from the radiant burner and received typically by a water weir (not shown) in accordance with known techniques.

Accordingly, it can be seen that the effluent gas is treated within the treatment chamber 90, which is heated by the sheet 130B. The humidified air provides products, such as oxygen (typically with a nominal range of 7.5% to 10.5%), as well as water (typically with a nominal range of 10% to 14%, and preferably 12%), depending whether or not oxygen enrichment occurs and on the humidity of the air, to the treatment chamber 90. The heat breaks down and/or the products react with the effluent gas stream within the treatment chamber 90 to clean the effluent gas stream. For example, $SiH_4$ and $NH_3$ may be provided within the effluent gas stream, which reacts with $O_2$ within the treatment chamber 90 to generate $SiO_2$, $N_2$, $H_2O$, $NO_x$. Similarly, $N_2$, $CH_4$, $C_2F_6$ may be provided within the effluent gas stream, which reacts with $O_2$ within the treatment chamber 90 to generate $CO_2$, HF, $H_2O$. Likewise, $F_2$ may be provided within the effluent gas stream, which reacts with $H_2O$ within the treatment chamber 90 to generate HF, $H_2O$.

Accordingly, embodiments provide a method and apparatus to combustively destroy waste gases from semiconductor-like processes utilising an RF induction heated porous-wall combustion chamber.

High power indirect heating is possible by induction heating. Providing the susceptor as a porous metal sheet allows for the possibility of mimicking radiant burner combustion systems by allowing gas to be passed through and heated to a high temperature. This opens a way of giving burner-like performance with an electrical system. The sheet may be un-sintered ceramic fibre or, beneficially, sintered metallic fibre.

In embodiments, microwave or resistive heating is used to heat the sheet 130A, 130B. In the case of microwave heating, a microwave generator is provided which couples with a waveguide located in the void 210 which conveys microwave energy to the sheet 130B which is formed of a dielectric material. In the case of resistive heating, a power supply is provided which couples with a conductor located in void 210 which conveys electrical energy to the sheet 130B which is formed of a ceramic material.

Accordingly, embodiments provide a burner assembly comprising a plurality of radiant burner elements housed within a housing. The elements are arranged to give combustion spaces bounded by the exit surfaces of the radiant burner elements on at least two faces. Inlet nozzles are provided in a top face, discharging into these combustion spaces. The burner elements may be single-sided or two-sided, depending on whether the burner elements are located between adjacent combustion spaces or not. Thus, embodiments provide a burner assembly comprising a plurality of combustion spaces separated by double-sided burner elements, terminated by single-sided burner elements at each end. The housing may bound a slot-like combustion space on each of its short sides with an unfired ceramic thermally-insulated material. This may be contoured to urge combustion by-products away from its surface and towards the process gas to be treated. The housing may additionally comprise recesses that house the ends of the radiant burner elements. A pilot burner for igniting the burner elements may be located in a pocket away from the combustion spaces with flame propagation occurring from burner element to burner element. The horizontal cross-section of the burner assembly may be square or rectangular. The combustion spaces may collectively exhaust into a common inlet of a downstream weir whose inlet cross-section matches that of the aperture through which the treated effluent stream is exhausted from the burner assembly.

Although illustrative embodiments of the invention have been disclosed in detail herein, with reference to the accompanying drawings, it is understood that the invention is not limited to the precise embodiments and that various changes and modifications can be effected therein by one skilled in the art without departing from the scope of the invention as defined by the appended claims and their equivalents.

The invention claimed is:

1. A radiant burner for treating an effluent gas stream from a manufacturing processing tool, comprising:
a plurality of treatment chambers, wherein each treatment chamber includes an effluent stream inlet for supplying a respective portion of said effluent gas stream to each treatment chamber for treatment therewithin; and
an end structure at least partially defining an end treatment chamber of the plurality of treatment chambers, said end structure comprising a wall which is foraminous through which treatment materials pass for introduction into said end treatment chamber, said foraminous wall at least partially defining said end treatment chamber; and
a pilot aperture separated from the end treatment chamber by the end structure.

2. The radiant burner of claim 1, further comprising a separating structure separating a pair of adjacent treatment chambers, said separating structure at least partially defining the pair of adjacent treatment chambers.

3. The radiant burner of claim 1, wherein said plurality of treatment chambers are arranged as a row of treatment chambers and a separating structure is located between a pair of adjacent treatment chambers within said row.

4. The radiant burner of claim 1, wherein said plurality of treatment chambers are arranged as a matrix comprising a plurality of rows of treatment chambers and a separating structure is located between a pair of adjacent treatment chambers within one row of the plurality of rows.

5. The radiant burner of claim 2, wherein said separating structure comprises a pair of foraminous walls through which the treatment materials pass for introduction into each of the pair of adjacent treatment chambers, each foraminous wall of the pair of foraminous walls at least partially defining a respective one of the pair of adjacent treatment chambers.

6. The radiant burner of claim 2, wherein said separating structure tapers in a direction of flow of said portion of said effluent gas stream.

7. The radiant burner of claim 5, wherein said separating structure comprises a foraminous connecting portion connecting said pair of foraminous walls along an edge.

8. The radiant burner of claim 7, wherein said foraminous connecting portion is curved.

9. The radiant burner of claim 2, wherein said separating structure comprises a treatment material inlet for supplying the treatment materials into a void defined by said separating structure.

10. The radiant burner of claim 1, wherein said end structure comprises a treatment material inlet for supplying the treatment materials into a void defined by said end structure.

11. The radiant burner of claim 10, wherein said treatment materials comprise at least one of air and fuel.

12. The radiant burner of claim 1, wherein each treatment chamber comprises a ceiling defining said effluent stream inlet for supplying said respective portion of said effluent gas stream to that treatment chamber.

13. The radiant burner of claim 1, wherein each treatment chamber comprises an open face through which a treated effluent gas stream exhausts.

14. The radiant burner of claim 2, comprising a housing configured to receive the separating structure, said housing at least partially defining each treatment chamber.

15. The radiant burner of claim 14, wherein said housing is configured to receive the end structure.

16. The radiant burner of claim 14, wherein said housing comprises a faceted portion that extends into each treatment chamber.

* * * * *